United States Patent
Gagliano et al.

(10) Patent No.: US 9,722,919 B2
(45) Date of Patent: Aug. 1, 2017

(54) TYING DATA PLANE PATHS TO A SECURE CONTROL PLANE

(71) Applicant: Cisco Technology, Inc., San Jose, CA (US)

(72) Inventors: Roque Gagliano, Pully (CH); Alvaro E. Retana, Raleigh, NC (US); Keyur P. Patel, San Jose, CA (US); Burjiz F. Pithawala, Cupertino, CA (US); Ed Kern, San Jose, CA (US); Carlos M. Pignataro, Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 313 days.

(21) Appl. No.: 14/160,804

(22) Filed: Jan. 22, 2014

(65) Prior Publication Data

US 2015/0207729 A1    Jul. 23, 2015

(51) Int. Cl.
| | | |
|---|---|---|
| H04L 29/08 | (2006.01) |
| H04L 12/721 | (2013.01) |
| H04L 12/741 | (2013.01) |
| H04L 12/805 | (2013.01) |
| H04L 12/715 | (2013.01) |
| H04L 29/06 | (2006.01) |
| H04L 12/24 | (2006.01) |

(52) U.S. Cl.
CPC ............. H04L 45/44 (2013.01); H04L 45/04 (2013.01); H04L 45/745 (2013.01); H04L 47/36 (2013.01); H04L 67/2819 (2013.01); H04L 69/22 (2013.01); H04L 41/0893 (2013.01)

(58) Field of Classification Search
CPC ... H04L 41/0893; H04L 45/44; H04L 45/745; H04L 47/03; H04L 67/1042
USPC .......................................... 370/254, 392, 393
See application file for complete search history.

(56) References Cited

U.S. PATENT DOCUMENTS

| | | | | |
|---|---|---|---|---|
| 5,425,023 A | * | 6/1995 | Haraguchi et al. | ........... 370/400 |
| 7,694,011 B2 | | 4/2010 | O'Rourke et al. | |
| 7,839,856 B2 | | 11/2010 | Sinha et al. | |
| 7,855,953 B2 | | 12/2010 | Filsfils et al. | |
| 2004/0039839 A1 | * | 2/2004 | Kalyanaraman | ........ H04L 45/34 |
| | | | | 709/238 |

(Continued)

OTHER PUBLICATIONS

Bryant, "Carrying Metadata in IP Networks", Network Working Group, Internet-Draft, draft-bryant-ip-metadata-00, Jun. 2013, 7 pages, The Internet Engineering Task Force Trust.

(Continued)

*Primary Examiner* — Mohammad Anwar
*Assistant Examiner* — Kokou R Detse
(74) *Attorney, Agent, or Firm* — Parker Ibrahim & Berg LLC; James M. Behmke; Stephen D. LeBarron (57) ABSTRACT

In one embodiment, a router located at an exit edge of an autonomous system (AS) receives a data packet in a data plane, and determines a destination of the data packet and an associated AS-path information to the destination. The router may then insert the AS-path information into the data packet, and forwards the data packet with the AS-path information toward the destination, such that a receiving device in a destination AS can validate whether the data packet was routed through a path that was secure from a control plane perspective based on a collection of one or more insertions of AS-path information.

22 Claims, 6 Drawing Sheets

(56) References Cited

U.S. PATENT DOCUMENTS

2007/0214275 A1* 9/2007 Mirtorabi et al. ............ 709/230
2008/0177896 A1 7/2008 Quinn et al.
2010/0246410 A1 9/2010 Tallet
2010/0263041 A1* 10/2010 Shea ................................ 726/14
2013/0286831 A1* 10/2013 Zwall ..................... H04L 45/02
                                                              370/235

OTHER PUBLICATIONS

Dickson, B., "Route Leaks—Definitions", SIDR nternet Draft, draft-dickson-sidr-route-leak-def-01, Mar. 2012, 9 pages, The Internet Engineering Task Force Trust.

Guichard, et al., "Carrying Metadata in MPLS Networks", Network Working Group, Internet-Draft, draft-guichard-mpls-metatadata-00, Jun. 2013, 11 pages, The Internet Engineering Task Force Trust.

Guichard, et al., "Common Metadata Header Format for IP/MPLS Networks", Network Working Group, Internet-Draft, draft-guichard-metatadata-header-00, Jun. 2013, 7 pages, The Internet Engineering Task Force Trust.

Postel, J., "Internet Protocol: Darpa Internet Program Protocol Specification", RFC 791, Sep. 1981, 49 pages, The Internet Engineering Task Force Trust.

Rekhter, et al., "A Border Gateway Protocol 4 (BGP-4)", Network Working Group, Request for Comments 1771, Mar. 1995, 57 pages, The Internet Engineering Task Force Trust.

* cited by examiner

TYING DATA PLANE PATHS TO A SECURE CONTROL PLANE

TECHNICAL FIELD

The present disclosure relates generally to computer networks, and, more particularly, to tying data plane paths to a secure control plane.

BACKGROUND

An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes exchange routing information to various network destinations. Border Gateway Protocol (BGP) is an exterior gateway protocol (EGP) that is used to exchange routing information among network elements (e.g., routers) in the same or different ASes. A computer host that executes a BGP process is typically referred to as a BGP host or a BGP device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a router located at an exit edge of an autonomous system (AS) receives a data packet in a data plane, and determines a destination of the data packet and an associated AS-path information to the destination. The router may then insert the AS-path information into the data packet, and forwards the data packet with the AS-path information toward the destination, such that a receiving device in a destination AS can validate whether the data packet was routed through a path that was secure from a control plane perspective based on a collection of one or more insertions of AS-path information.

In addition, according to one or more embodiments of the disclosure, a receiving device receives a data packet in a data plane, and determines a destination of the data packet. Once determining that the destination of the data packet is within a same AS as the receiving device (e.g., it is the destination or it is a router within the destination AS), the receiving device, then the receiving device may extract a collection of one or more insertions of AS-path information from the data packet, and validate whether the data packet was routed through a path that was secure from a control plane perspective based on the collection of one or more insertions of AS-path information.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
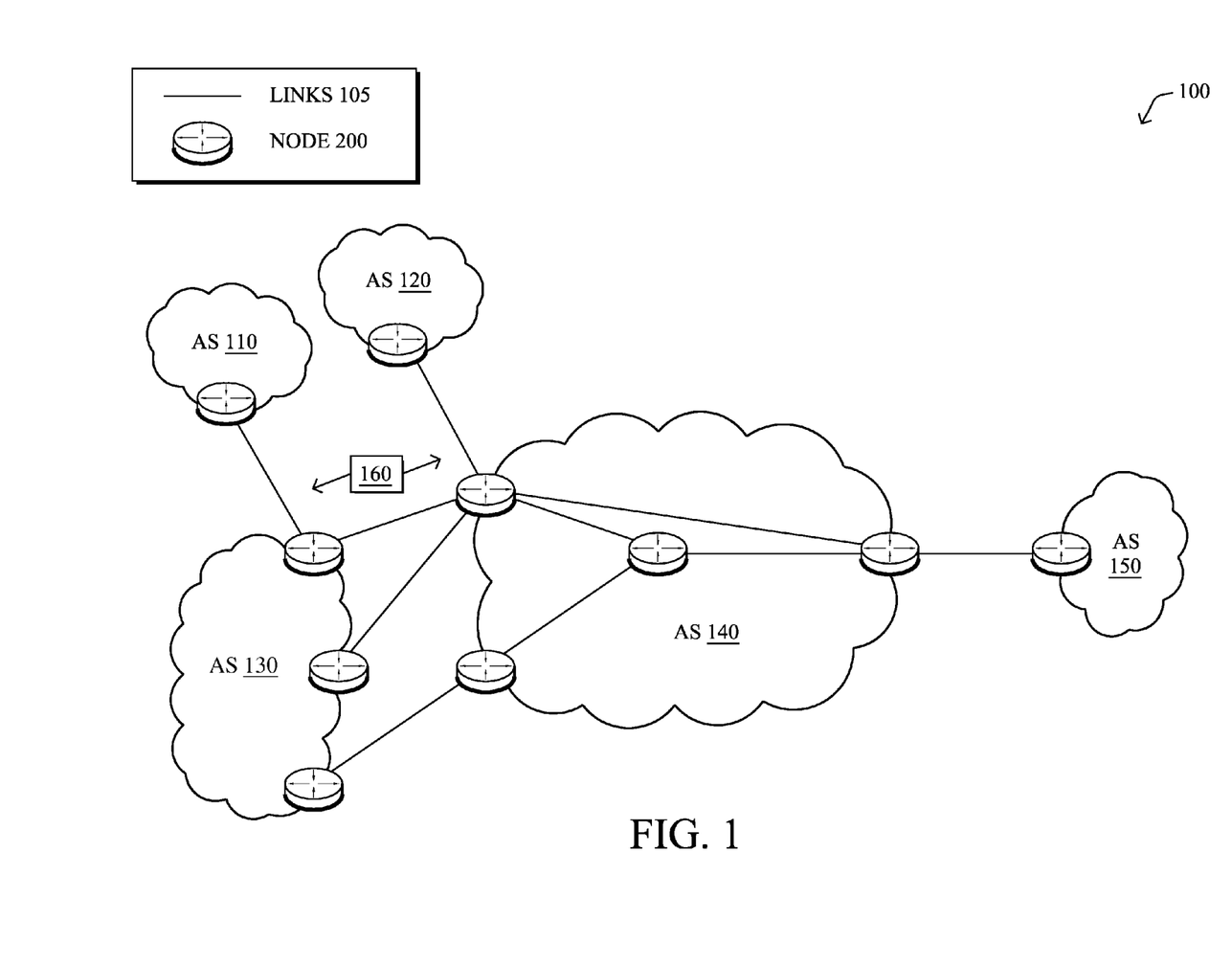
FIG. 1 illustrates an example simplified communication network including one or more ASes.
Figure 2:
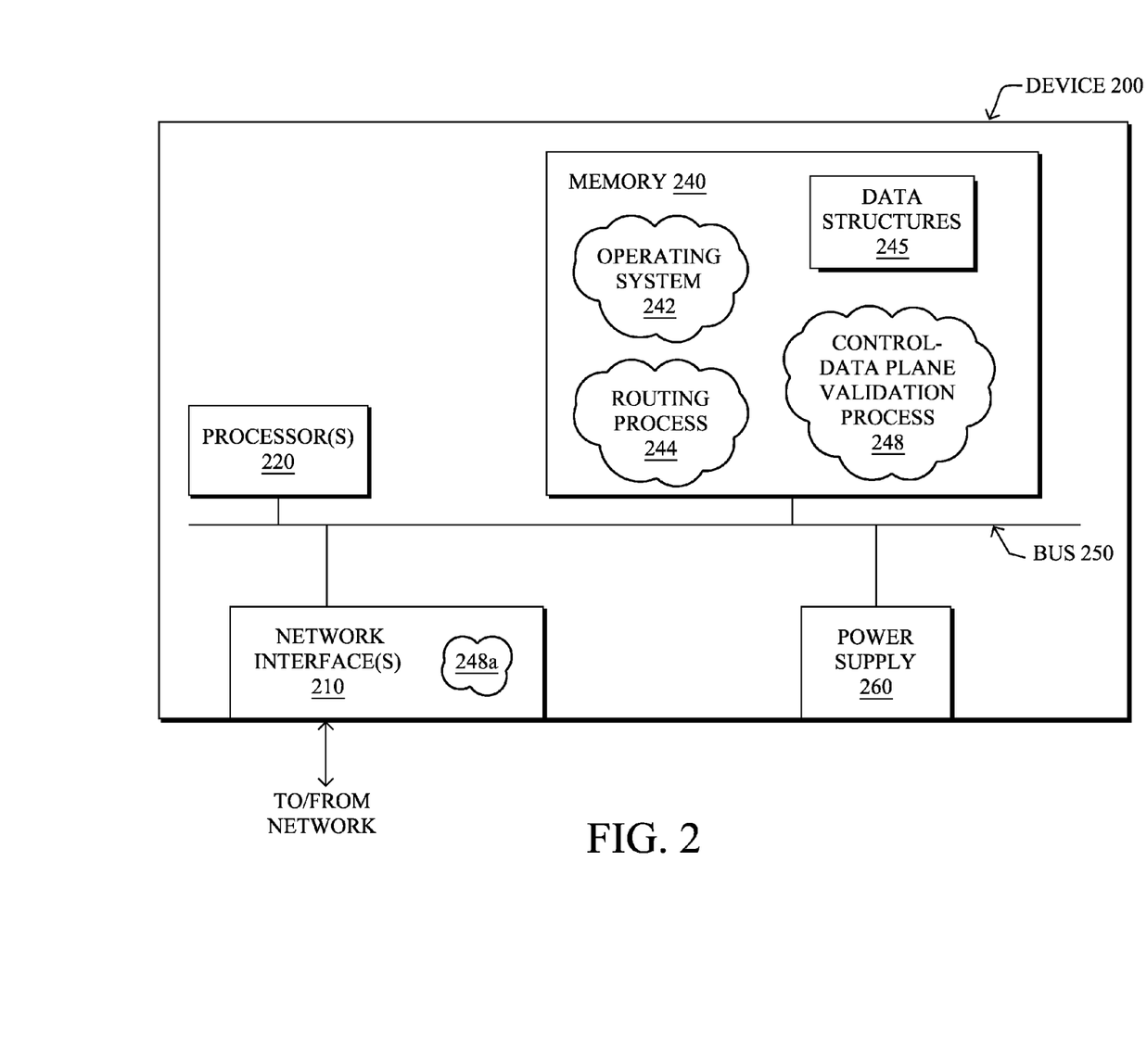
FIG. 2 illustrates an example simplified network device/node.

FIG. 1 is a schematic block diagram of an example computer network 100 illustratively comprising nodes/devices 200 (e.g., as depicted in FIG. 2) interconnected by various methods of communication. For instance, the links 105 may be any suitable combination of wired links and shared media (e.g., wireless links, etc.) where certain nodes 200, such as, e.g., routers, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity.

Data packets 160 (e.g., traffic and/or messages sent between the devices/nodes) may be exchanged among the nodes/devices of the computer network 100 using predefined network communication protocols such as certain known wired protocols, as well as wireless protocols or other shared-media protocols where appropriate.

The computer network 100 includes a set of autonomous systems (AS) 110, 120, 130, 140 and 150. The computer network 100 may be positioned in any suitable network environment or communications architecture that operates to manage or otherwise direct information using any appropriate routing protocol or data management standard. For example, computer network 100 may be provided in conjunction with a border gateway protocol (BGP).

As noted above, an AS may be a collection of connected Internet Protocol (IP) routing prefixes under the control of one or more network operators that presents a common, clearly defined routing policy to a network (e.g., the Internet). Usually, an AS comprises network devices, e.g., nodes/devices 200, that are established on the edge of the system, and that serve as the system's ingress and egress points for network traffic. Moreover, the devices 200 may be considered edge devices, border routers, or core devices within the respective AS. These network elements typically, but not always, are routers or any other element of network infrastructure suitable for switching or forwarding data packets according to a routing protocol or switching protocol. For the purposes of the present disclosure, the network elements located within an AS may alternatively be referred to as "forwarding devices" or "intermediate devices." Moreover, for illustration purposes, the ASes 110, 120, 130, 140 and 150 are shown with a limited number of devices 200. In an actual implementation, however, an AS normally comprises numerous routers, switches, and other elements.

Each AS 110, 120, 130, 140 and 150 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the devices 200 within the ASes, the devices 200 may exchange routing information to various network destinations. As described above, BGP is conventionally used to exchange routing and reachability information among network elements, e.g., devices 200, within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts (devices 200), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of ASes, e.g., links 105, may be referred to as an "AS_PATH." The AS_PATH attribute indicates the list of ASes that must be traversed to reach the address destination. For example, as illustrated in FIG. 1, the AS 130 may store an AS_PATH attribute of "110 120 140 150" where the address destination is the AS 150 (or a particular IP address within AS 150). Here, the AS_PATH attribute indicates that the path to the address destination AS 150 from AS 130 passes through ASes 110, 120 and 140, in that order.

It should be understood that although it is preferable that all devices 200 in the respective ASes 110, 120, 130, 140 and 150 be configured according to BGP, in a real-world implementation, it may be unlikely that each device communicates using BGP. Thus, the disclosed embodiments are applicable to scenarios where all devices 200 in the network 100 are configured according to BGP, as well as scenarios where only a subset of the devices 200 is configured as such. Moreover, between any of the ASes, there may be a single communication path 105, e.g., between AS 110 and AS 130, as shown in FIG. 1, or there may be multiple communication paths 105, e.g., between AS 120 and AS 140. Thus, the disclosed embodiments are applicable to either case, as described in further detail below.

Moreover, a security extension to the BGP has been developed, referred to as BGPSEC, which provides improved security for BGP routing. The motivation for developing BGPSEC is that BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, the goal of BGPSEC is to use signatures to protect the AS Path attribute of BGP update messages so that a BGP speaker can assess the validity of the AS Path in update messages that it receives.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, etc.), at least one processor 220, and a memory 240 interconnected by a system bus 250, as well as a power supply 260 (e.g., battery, plug-in, etc.). Furthermore, the device 200 may be part of an AS, as illustrated in FIG. 1.

The network interface(s) 210 contain the mechanical, electrical, and signaling circuitry for communicating data over links 105 coupled to the network 100, and thus effecting communication among the ASes 110, 120, 130, 140 and 150. The network interfaces may be configured to transmit and/or receive data using a variety of different communication protocols. The nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, in accordance with BGP or BGPSEC, for example, and an illustrative control-and-data plane validation ("control-data plane validation") process 248, as described herein. While control-data plane validation 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as a BGP or BGPSEC, as described above. Alternatively, or additionally, the routing process 244 may be configured according to a non-BGP protocol, such as various proactive or reactive routing protocols, as will be understood by those skilled in the art. As described above, the disclosed embodiments are applicable to cases where each router in a single AS, or in several ASes, follows BGP, as well as cases where only a subset of routers follow BGP, whereby the remaining routers are configured according to a different routing protocol. In either case, functions may, on capable devices, be configured to manage a routing/forwarding table (a data structure 245) containing, e.g., data used to make routing/forwarding decisions. In the case of BGP, for example, the BGP logic of a router, e.g., routing process 244, is used to collect BGP AS_PATH information from BGP tables of border routers, e.g., "peers," of an AS, to construct paths to various destinations. BGP peers exchange or advertise routes using information stored in their routing table, e.g., a data structure 245, via the BGP UPDATE message.

As noted above, routing security is a key concern in BGP-configured AS networks. When dealing with routing security, one must consider various aspects of the router architecture, including the so-called data plane and control plane. As is known in the art, the data plane (or "forwarding plane") defines the part of the router architecture that decides what to do with packets arriving on an inbound interface. Commonly, it refers to a table in which the router looks up the destination address of the incoming packet and retrieves the information necessary to determine the path from the receiving element, through the internal forwarding fabric of the router, and to the proper outgoing interface(s). Put another way, the data plane involves network traffic that goes through the router, instead of to the router.

On the other hand, the control plane defines the part of the router architecture that is concerned with developing the network map, or the information in a routing table that defines what to do with incoming packets. Control plane functions, such as operating in accordance with routing protocols, run in the architectural control element. In contrast to the data plane, the control plane involves network traffic that is destined to or locally originated by the router itself.

Currently, methods exist for validating either data plane traffic or control plane traffic, but not both in concurrence. For instance, the Internet Control Message Protocol (ICMP) extensions provide for, among other things, a "traceroute," which performs a data continuity check within the data plane. Alternatively, a specialized BGP attribute, known as the BGPSEC_Path_Signature, has been developed to digitally sign the different ASes a control plane packet has traversed. However, these methods fail to validate whether a data plane packet has actually taken the path validated at the control plane. In other words, there is no way to correlate and verify the security control-and-data plane synchronization (e.g., "connectivity verification") for data traveling across ASes in a computer network.

Tying Data Plane Paths to a Secure Control Plane

The techniques herein may be used to answer whether an IP packet takes the path validated by the secured control plane. In particular, as described below, an illustrative implementation involves the addition of a new IP option (or encapsulation), where routers in the AS edge (e.g., each router) randomly insert to the IP header the available control plane security information (in BGPSEC, the BGPSEC_Path_Signatures attribute). The techniques herein thus may utilize a passive monitoring approach, which can be used in many different workflows.

The techniques herein may be non-intrusive, as they do not introduce new packets, but basically add information into existing IPv4 or IPv6 packets that travel in the data plane (e.g., in a similar fashion as the IPv4 Route-Record option defined in RFC 791). In this manner, the techniques herein may be a passive method utilizing metadata piggybacked in user packets. Illustratively, the techniques herein may be used as a troubleshooting tool or as passive monitoring to acquire statistical information at the destination network. Additionally or alternatively, the techniques may also be used to influence policy in general.

Specifically, according to one or more embodiments of the disclosure as described in detail below, a router located at an exit edge of an autonomous system (AS) may receive a data packet in a data plane, and determine a destination of the data packet and an associated AS-path information to the destination. The router may then insert the AS-path information into the data packet, and forward the data packet with the AS-path information toward the destination. The AS-path information included in the data packet may allow a receiving device in a destination AS to validate whether the data packet was routed through a path that was secure from a control plane perspective based on a collection of one or more insertions of AS-path information.

Illustratively, the techniques described herein may be performed by hardware, software, and/or firmware, such as in accordance with the "control-data plane validation" process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to BGP, or other suitable communication protocols, and as such, may be processed by similar components understood in the art that execute those protocols, accordingly. Moreover, the "control-data plane validation" process 248/248a may be hosted within the particular router, e.g., the device 200, as shown in FIG. 2, or may alternatively be hosted outside the device 200.

Figure 3:
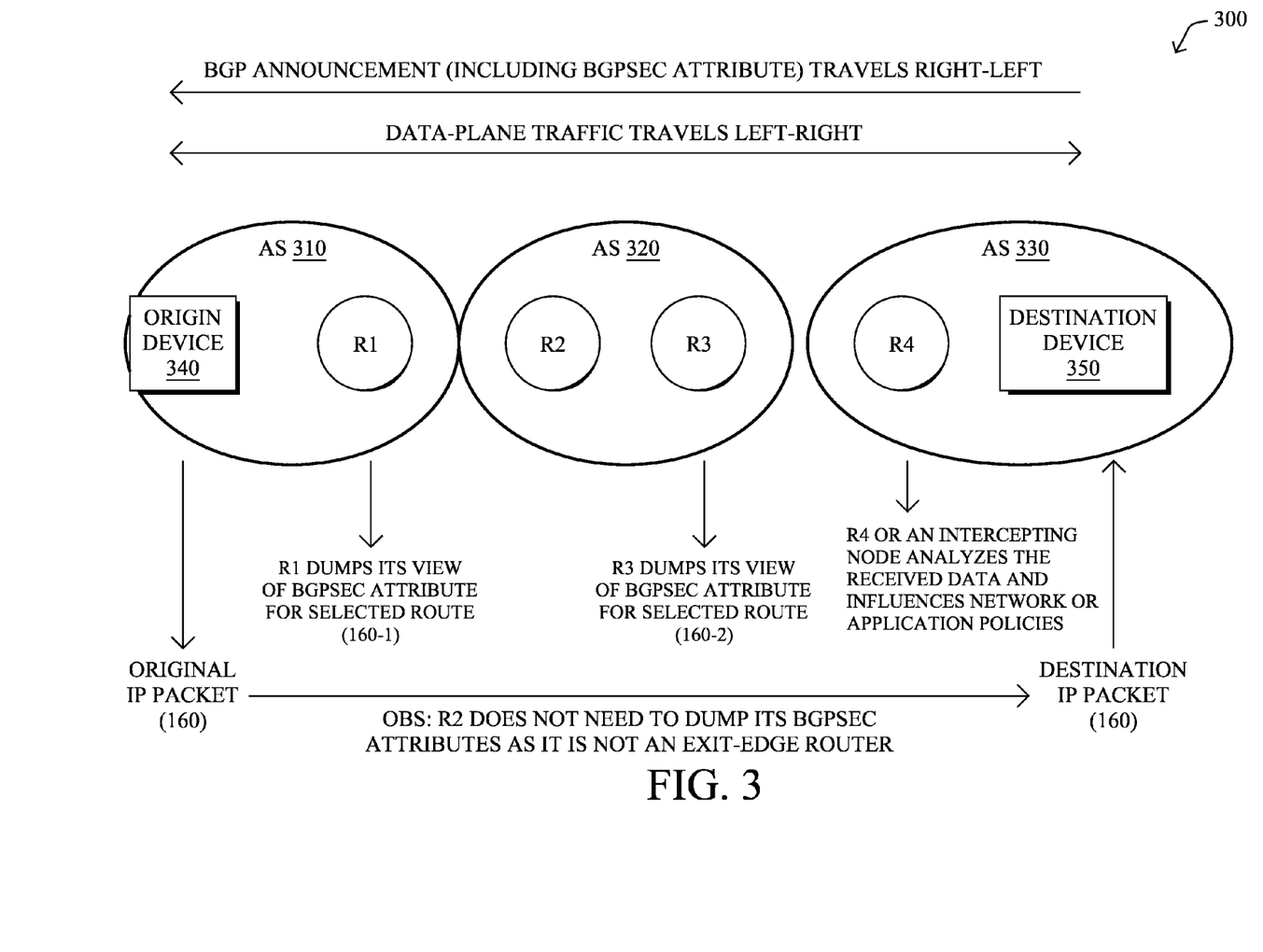
FIG. 3 illustrates an example simplified packet handling for tying data plane paths to a secure control plane.

Operationally, the techniques herein consider a network of different autonomous systems, where each one of them has its set of edge and core routers. An alternative view of a network 300 is shown in FIG. 3, where AS 310 comprises an origin device 340 and an edge router R1, an intermediate AS 320 comprises edge routers R2 and R3, and AS 330 comprises edge router R4 and destination device 350.

Particularly, according to certain illustrative techniques herein, edge routers may participate in the inter-domain routing system by speaking BGP and specially BGPSEC (or some other suitable inter-domain routing and security protocols). Thus, in certain embodiments, all edge routers have cryptographic information of the AS_PATH the BGP UPDATE messages have travelled, and will make routing decisions based on that information. In certain embodiments, therefore, incoming-edge devices receiving BGP will perform BGPSEC validations while outgoing-edge devices will perform BGPSEC signing.

According to one or more embodiments herein, the techniques add to actual data packets (e.g., to the IP layer of that packet) the cryptographic BGP path information available on the control plane so that a destination station (or intercepting device) can evaluate if the data plane packet transited the route originally validated by the different control planes. The insertion of this information may occur to the header of a packet, such as the metadata portion, for example. The information may be inserted in accordance with a possibility presented in an Internet Engineering Task Force (IETF) Internet Draft entitled "Carrying Metadata in IP Networks"<draft-bryant-ip-metadata-00> (June 2013 edition), or else by using an IP hop-by-hop option (similar to a route-record option) in the original packet or in the outer header of an encapsulation (that maintains the source/destination flow information), for example. Notably, the Internet Control Message Protocol (ICMPv4 for IPv4 and ICMPv6 for IPv6) provides for, among other things, a "traceroute," which performs data continuity check within the data plane and control plane.

In an illustrative implementation of the techniques herein, each (exit edge) router in the path of an IP packet (e.g., IPv4 or IPv6) will write to the packet header the cryptographic path information in their system for the respective BGP table entry. In the case of BGPSEC, the cryptographic information to be included would consist of the complete BGPSEC_Path_Signatures BGP Attribute. In one embodiment, the insertion of this information is only necessary on the interface where a packet leaves an AS (exit/egress router), and not on all the routers in the path.

Figure 4:
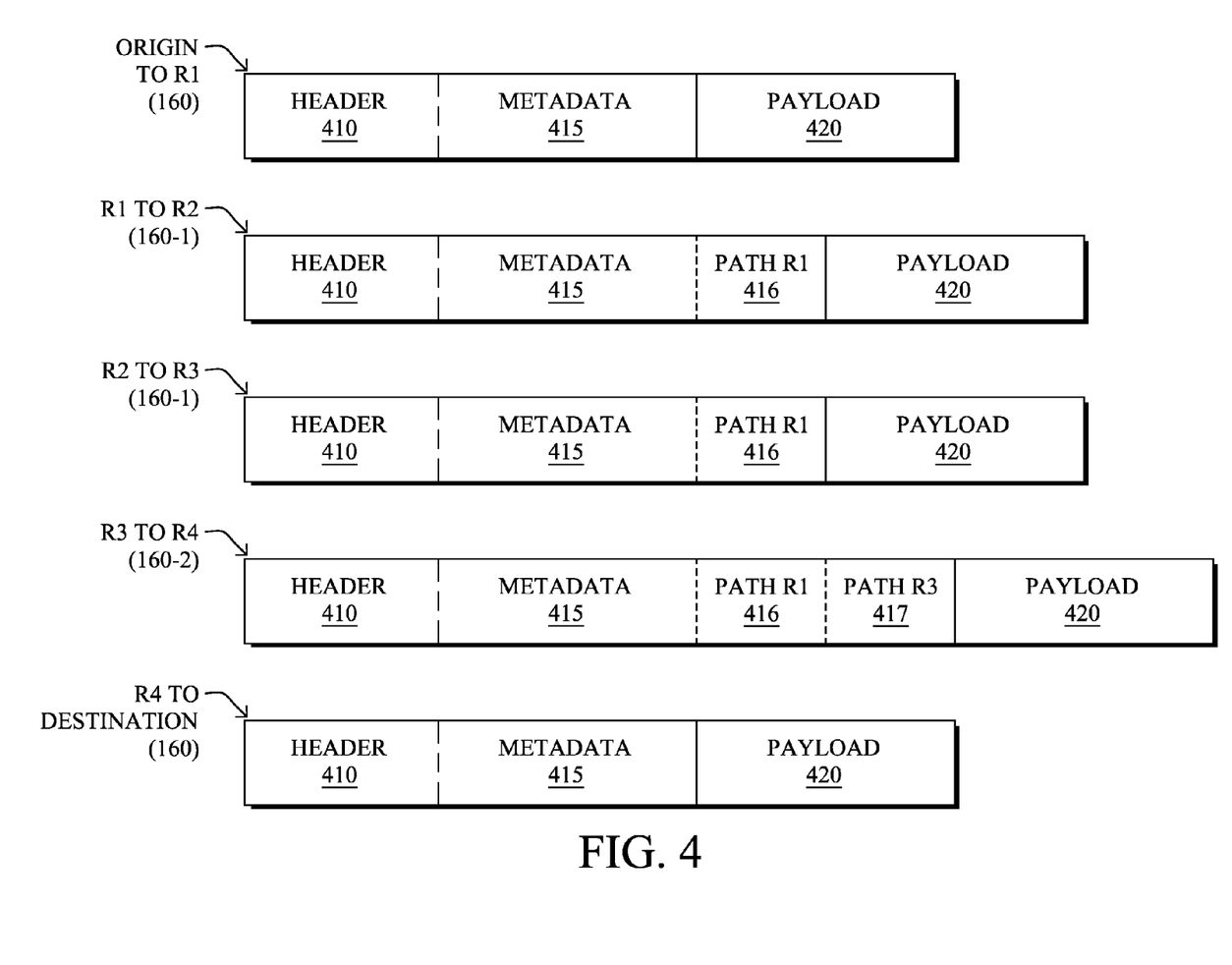
FIG. 4 illustrates an example simplified packet format for tying data plane paths to a secure control plane.

With reference still to FIG. 3, and now in conjunction with FIG. 4 showing simplified packet formats, assume, for example, that a data packet 160 is originated at an origin device/station 340 and sent toward a destination device 350 via AS 310 egress router R1. At this point, the original packet comprises a header 410, associated metadata 415, and a payload 420, as may be appreciated by those skilled in the art. At this point, R1 dumps its view of the BGPSEC Attribute for the selected route, inserting it into the packet 160-1 as "R1 Path" 416 (illustratively within the metadata 415, though not limited thereto). Ingress router R2 of AS 320 receives the updated packet 160-1, and since R2 is an ingress router (i.e., not an exit-edge router), it does not need to dump its BGPSEC attributes and may forward the packet toward R3 unchanged. As such, R3, an exit router, may dump its view of BGPSEC Attribute for the selected route ("R3 Path" 417) into the packet (now labelled 160-2), and forward the packet 160-2 into AS 330 via R4. Accordingly, in one embodiment, R4, or some other intercepting node, may analyze the received data (and as described herein, may also influence network or application policies), and may restore the packet to its original form 160 by removing the embedded BGPSEC Attributes. In particular, in this embodiment if a router (or other device) examines the path information, then the cryptographic information can be stripped off the packet (so that the destination device is not burdened).

Specifically, once the packet with embedded data arrives at the end station (destination device 350, or illustratively the intercepting device, R4), the cryptographic path information may be validated to determine whether the packets have been routed through a path that was secure from a control plane perspective. Said differently, in one embodiment, once the cryptographic information has reached the destination host (end station), it can be validated and analyzed, such as by using the RPKI. The destination host implements an algorithm that checks that every AS hop in the different received cryptographic extensions (e.g., BGPSEC_Path_Signatures) 416, 417, etc., is valid and that the proper ASPATH chains are followed. Alternatively, in the embodiment shown in FIGS. 3-4, a router (or an intercepting deep packet inspection (DPI) device) at the destination network could capture the information from the new IP header option and validate it, as the router is already implementing BGPSEC validation.

Based on the BGP path information/validation, network policy may be influenced, and statistical analysis/alarms will be available from the routers. For example, this information could affect the BGP policies currently in use, and/or may be made available to the origin device through a sharing mechanism, e.g., one similar to a route server/looking glass.

For the BGP path insertion, routers could perform the techniques herein in a sampled way, where one over a given number of packets in every flow includes the added cryptographic path information. Additionally, the cryptographic information could be added in only specially inserted and marked packets (e.g., packets with a given IP protocol number, a certain type of packet, a certain class of packet, a certain priority of packet, etc.). Also, in one embodiment, routers may be configured to rate limit the amount of processing availability to spend on the operation to avoid an inadvertent denial of service (DoS) attack being triggered on its own.

Furthermore, to avoid problems with exceeding maximum transmission unit (MTU) sizes, the routers inserting cryptographic information in the path of data-plane packets may confirm that the total size of the packets is kept under the IPv6 minimal MTU size of 1280 bytes (or whatever MTU size is in place in the selected network transmission protocol). The estimated packet size of this new option will be less than 400 bytes for a typical Internet diameter (i.e., not per AS, but considering the average ASPATH length of four ASes). As the average packet size for the Internet is still below 800 bytes, a router should not have problem finding packets to insert the added information. In one embodiment, routers may introduce the BGP path information randomly or to a select portion of packets, so may be configured to apply the techniques herein for packets that have an appropriate packet size (e.g., avoiding adding bits to already large packets).

Certain embodiments of the techniques described herein are equipped to handle possible load-balancing techniques between different paths (e.g., equal-cost-multi-path, or ECMP). That is, in certain embodiments, load-balancing is not problematic because if more than one path is available, routers in all the paths will at one point introduce the corresponding BGP path information, especially by introducing enough entropy to allow covering all ECMP options. Also, as the sampling decisions are taken in each router, a simple implementation would be to round-robin the insertion of the additional information over all paths.

Similar to the route-record option being used for management purposes using the known "ping -R" option, the techniques herein may be used to provide a feedback mechanism. However, unlike "ping-R", with certain embodiments of the techniques described herein, the BGPSEC security information may be additionally available, and more importantly, the techniques herein may provide end-to-end BGPSEC control-and-data plane correlation and verification. For instance, as the techniques herein are an "online" solution where data is added to real data-plane IP packets and results are analyzed by the destination (unidirectional forward solution), by applying these techniques to traceroute-like probe packets, the validation may (also) occur at the origin device, where returned packets (e.g., in response to an incrementally increased and expired time-to-live counter) include the BGPSEC path information from each edge device, accordingly. For an example of such traceroute-like probe packets, reference is made to commonly-owned U.S. Pat. No. 9,641,430, entitled "Verifying Data Plane Paths Based on a Validated Secure Control Plane", which was filed by Gagliano et al. on even date herewith, the contents of which are hereby incorporated by reference in their entirety.

Figure 5:
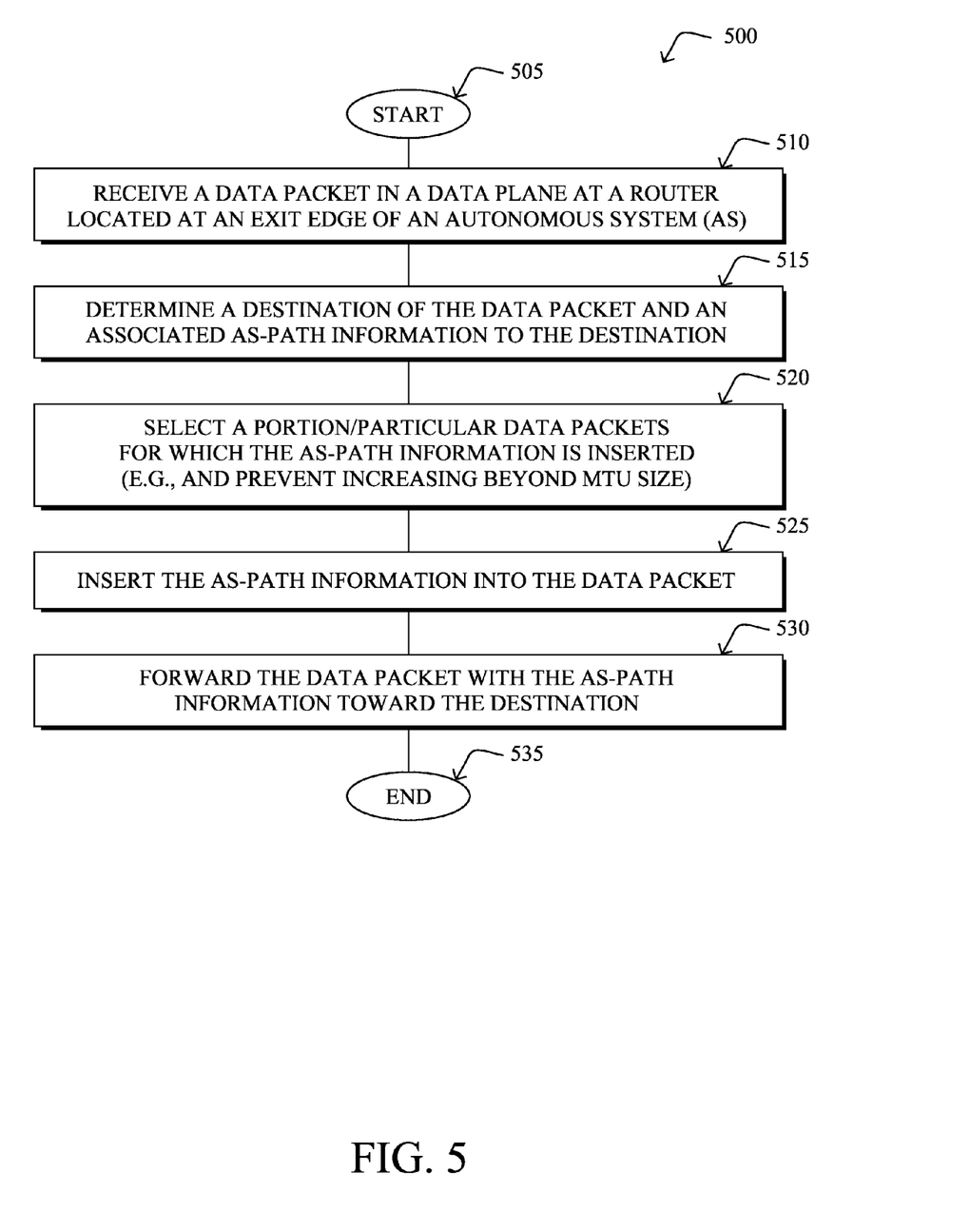
FIG. 5 illustrates an example simplified procedure for tying data plane paths to a secure control plane.

FIG. 5 illustrates an example simplified procedure for tying data plane paths to a secure control plane in accordance with one or more embodiments described herein. The procedure 500 may start at step 505, and continues to step 510, where, as described in greater detail above, a router located at an exit edge of an autonomous system (AS) receives a data packet 160 in a data plane. In step 515, the router may determine a destination of the data packet and an associated AS-path information to the destination, where as mentioned above, the AS-path information may comprise a border gateway protocol (BGP) Path attribute, such as a BGP_Path_Signatures BGP attribute. In step 520, the router may optionally select a portion of data packets for which the AS-path information is inserted, such as particular data packets selected from: random data packets; a particular type of data packet; a particular class of data packet; a particular priority of data packet; a particular protocol of data packet; a particular size of data packet (e.g., to prevent insertion of the AS-path information if the inserting would increase a size of the data packet beyond an MTU size), and so on.

Figure 6:
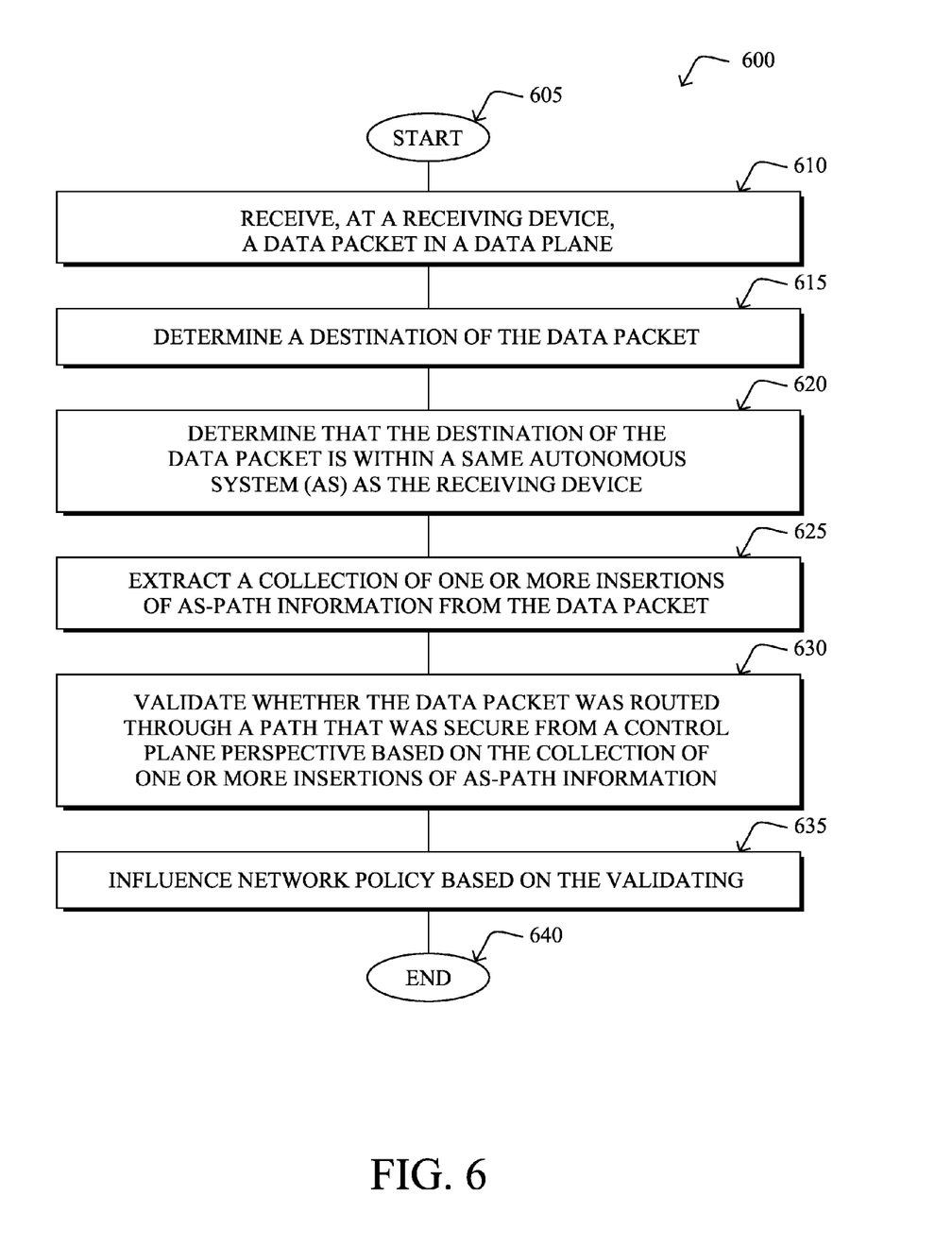
FIG. 6 illustrates another example simplified procedure for tying data plane paths to a secure control plane.

Accordingly, in step 525, the router may insert the AS-path information into the data packet (e.g., into a metadata portion of the data packet or into a hop-by-hop option within a header portion of the data packet, as detailed above), and forwards the data packet in step 530 with the AS-path information toward the destination, such that a receiving device in a destination AS can validate whether the data packet was routed through a path that was secure from a control plane perspective based on a collection of one or more insertions of AS-path information (e.g., as in FIG. 6 below). It should be understood that the header portion of the data packet may incorporate various header types, such as an Extension Header, in the instance of IPv6, for example. The illustrative and simplified procedure 500 may then end in step 535.

In particular, FIG. 6 illustrates another example simplified procedure for tying data plane paths to a secure control plane in accordance with one or more embodiments described herein. The procedure 600 may start at step 605, and continues to step 610, where, as described in greater detail above, a receiving device (e.g., the actual destination or an intercepting device located within the destination AS) receives a data packet in a data plane, and determines a destination of the data packet in step 615. Upon determining in step 620 that the destination of the data packet is within a same AS as the receiving device, then in step 625, if so configured, the receiving device extracts a collection of one or more insertions of AS-path information from the data packet. Accordingly, in step 630, the receiving device (e.g., destination or so-configured intercepting device) may validate whether the data packet was routed through a path that was secure from a control plane perspective based on the collection of one or more insertions of AS-path information. As mentioned above, the receiving device may also influence network policy based on the validating in step 635, prior to the illustrative and simplified procedure 600 ending in step 640.

While certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, tie data plane paths to a secure control plane. In particular, while current techniques only attempt to secure the control plane, the techniques herein may be used to verify that the data-plane is actually following the secured control plane. In this sense, without the techniques herein, the idea that a secure control plane protects the data plane could be challenged. An advantage of the techniques herein is thus to provide a mechanism to cryptographically validate that the data-plane followed paths validated by the control plane. Another advantage is the passive monitoring nature of the techniques as described.

While there have been shown and described illustrative embodiments that provide for tying data plane paths to a secure control plane, it is to be understood that various other adaptations and modifications may be made within the spirit and scope of the embodiments herein. For example, the embodiments have been shown and described herein with relation to BGP-configured networks. However, the embodiments in their broader sense are not as limited, and may, in fact, be used with other types of inter-AS/domain protocols. That is, while certain protocols are shown, such as BGP and BGPSEC, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising: receiving a data packet in a data plane at a router located at an exit edge of an autonomous system (AS); determining a destination of the data packet and an associated AS-path information to the destination; selecting particular data packets for which the AS-path information is inserted from at least one of a particular type of data packet; a particular class of data packet; a particular priority of data packet; a particular protocol of data packet; or a particular size of data packet; inserting the AS-path information into the data packet in the data plane if the data packet is selected; and forwarding the data packet with the AS-path information toward the destination wherein a receiving device in a destination AS that receives the data packet validates whether the data packet in the data plane was routed through a path that was secure from a control plane perspective based on a collection of one or more insertions of AS-path information in one or more data packets received on the data plane.

2. The method as in claim 1, wherein the AS-path information comprises a border gateway protocol (BGP) Path attribute.

3. The method as in claim 2, wherein the AS-path information comprises a BGP_Path_Signatures BGP attribute.

4. The method as in claim 1, wherein the AS-path information is inserted into a metadata portion of the data packet.

5. The method as in claim 1, wherein the AS-path information is inserted into a hop-by-hop option within a header portion of the data packet.

6. The method as in claim 1, further comprising: selecting a portion of data packets for which the AS-path information is inserted.

7. The method as in claim 1, further comprising: preventing insertion of the AS-path information if the inserting would increase a size of the data packet beyond a maximum transmission unit (MTU) size.

8. The method as in claim 1, wherein the receiving device is one of either the destination or an intercepting device located within the destination AS.

9. A method, comprising: receiving, at a receiving device, a data packet in a data plane; determining a destination of the data packet; determining that the destination of the data packet is within a same autonomous system (AS) as the receiving device; extracting a collection of one or more insertions of AS-path information from the data packet, the one or more insertions of AS-path information inserted in the data pack based on at least one of a particular type of the data packet; a particular class of the data packet; a particular priority of the data packet; a particular protocol of the data packet; or a particular size of the data packet; and validating whether the data packet in the data plane was routed through a path that was secure from a control plane perspective based on the collection of one or more insertions of AS-path information in one or more data packets received on the data plane.

10. The method as in claim 9, wherein the AS-path information comprises a border gateway protocol (BGP) Path attribute.

11. The method as in claim 10, wherein the AS-path information comprises a BGP_Path_Signatures BGP attribute.

12. The method as in claim 9, wherein the AS-path information is inserted into one of either a metadata portion of the data packet or a hop-by-hop option within a header portion of the data packet.

13. The method as in claim 9, wherein the receiving device is one of either the destination or an intercepting device located within the destination AS.

14. The method as in claim 9, further comprising: influencing network policy based on the validating.

15. An apparatus, comprising: one or more network interfaces to communicate with a computer network as an edge router for an autonomous system (AS); a processor coupled to the network interfaces and configured to execute one or more processes; and a memory configured to store a process executable by the processor, the process when executed operable to: receive a data packet in a data plane as a router located at an exit edge of an autonomous system (AS); determine a destination of the data packet and an associated AS-path information to the destination; select particular data packets for which the AS-path information is inserted from at least one of a particular type of data packet; a particular class of data packet; a particular priority of data packet; a particular protocol of data packet; or a particular size of data packet; insert the AS-path information into the data packet in the data plane if the data packet is selected; and forward the data packet with the AS-path information toward the destination, wherein a receiving device in a destination AS that receives the data packet validates whether the data packet in the data plane was routed through a path that was secure from a control plane perspective based on a collection of one or more insertions of AS-path information in one or more data packets received on the data plane.

16. The apparatus as in claim 15, wherein the AS-path information comprises a border gateway protocol (BGP) BGP_Path_Signatures BGP attribute.

17. The apparatus as in claim 15, wherein the AS-path information is inserted into one of either a metadata portion of the data packet or a hop-by-hop option within a header portion of the data packet.

18. The apparatus as in claim 15, wherein the process when executed is further operable to: prevent insertion of the AS-path information if the inserting would increase a size of the data packet beyond a maximum transmission unit (MTU) size.

19. An apparatus, comprising: one or more network interfaces to communicate with a computer network; a processor coupled to the network interfaces and configured to execute one or more processes; and a memory configured to store a process executable by the processor, the process when executed operable to: receiving, as a receiving device, a data packet in a data plane; determine a destination of the data packet; determine that the destination of the data packet is within a same autonomous system (AS) as the receiving device; extract a collection of one or more insertions of AS-path information from the data packet, the one or more insertions of AS-path information inserted in the data pack based on at least one of a particular type of the data packet; a particular class of the data packet; a particular priority of the data packet; a particular protocol of the data packet; or a particular size of the data packet; and validate whether the data packet in the data plane was routed through a path that was secure from a control plane perspective based on the collection of one or more insertions of AS-path information in one or more data packets received on the data plane.

20. The apparatus as in claim 19, wherein the AS-path information comprises a border gateway protocol (BGP) BGP_Path_Signatures BGP attribute.

21. The apparatus as in claim 19, wherein the apparatus is one of either the destination or an intercepting device located within the destination AS.

22. The apparatus as in claim 19, wherein the process when executed is further operable to: influence network policy based on the validating.

* * * * *